United States Patent
Song et al.

(10) Patent No.: US 10,557,036 B2
(45) Date of Patent: Feb. 11, 2020

(54) METAL-BASED HYDROGEN SULFIDE SCAVENGER AND METHOD OF PREPARING SAME

(71) Applicant: BAKER HUGHES, A GE COMPANY, LLC, Houston, TX (US)

(72) Inventors: Jingshe Song, Sugar Land, TX (US); Zhenning Gu, Sugar Land, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 294 days.

(21) Appl. No.: 15/458,548

(22) Filed: Mar. 14, 2017

(65) Prior Publication Data

US 2017/0260095 A1 Sep. 14, 2017

Related U.S. Application Data

(60) Provisional application No. 62/308,071, filed on Mar. 14, 2016.

(51) Int. Cl.

| | | |
|---|---|---|
| *C08L 95/00* | (2006.01) | |
| *C04B 26/26* | (2006.01) | |
| *C08K 5/00* | (2006.01) | |
| *C08K 3/32* | (2006.01) | |
| *C08K 9/12* | (2006.01) | |
| *C04B 103/00* | (2006.01) | |
| *C04B 103/40* | (2006.01) | |
| *C04B 111/00* | (2006.01) | |
| *C08K 3/22* | (2006.01) | |
| *C08K 3/11* | (2018.01) | |

(52) U.S. Cl.
CPC .............. *C08L 95/00* (2013.01); *C04B 26/26* (2013.01); *C08K 3/32* (2013.01); *C08K 5/0091* (2013.01); *C08K 9/12* (2013.01); *C01P 2004/61* (2013.01); *C01P 2004/62* (2013.01); *C04B 2103/0069* (2013.01); *C04B 2103/408* (2013.01); *C04B 2111/00017* (2013.01); *C08K 3/11* (2018.01); *C08K 2003/2248* (2013.01); *C08L 2555/32* (2013.01); *C08L 2555/50* (2013.01)

(58) Field of Classification Search
CPC .............. C04B 26/26; C04B 2103/408; C04B 2103/0069; C04B 2111/00017; C08L 95/00; C08L 2555/30; C08L 2555/32; C08L 2555/50; C08K 9/12; C08K 3/11; C01P 2004/61; C01P 2004/62
See application file for complete search history.

(56) References Cited

U.S. PATENT DOCUMENTS

| | | | | |
|---|---|---|---|---|
| 5,000,835 | A * | 3/1991 | Taylor .................... | C08K 5/098 106/273.1 |
| 6,569,351 | B1 * | 5/2003 | Baumgardner ......... | C08L 95/00 252/182.13 |
| 7,495,045 | B2 * | 2/2009 | Buras ..................... | C08L 95/00 524/68 |
| 7,713,345 | B2 * | 5/2010 | Maldonado .............. | C08K 3/32 106/284.1 |
| 8,424,243 | B1 | 4/2013 | Narcisco et al. | |
| 2009/0149577 | A1 * | 6/2009 | Butler ..................... | C08L 95/00 524/68 |
| 2013/0092597 | A1 * | 4/2013 | Stark ...................... | C10G 29/04 208/45 |
| 2015/0218342 | A1 * | 8/2015 | Martin ................... | C08K 5/175 106/157.1 |
| 2016/0289450 | A1 * | 10/2016 | Mouazen ................ | C04B 22/16 |
| 2017/0022109 | A1 | 1/2017 | Poland et al. | |

FOREIGN PATENT DOCUMENTS

| | | | | |
|---|---|---|---|---|
| DE | 111919 A | * | 3/1975 | ............. B01F 17/02 |
| EP | 3121231 A1 | | 1/2017 | |

OTHER PUBLICATIONS

DD 111919 A Derwent Summary (Year: 2019).*
AT 358977 Espacenet Machine Translation; Patent Family Member of DD 111919 A (Year: 2019).*
European Patent Office; PCT International Search Report, Issued in Connection to PCT/US2017/022293; dated May 17, 2017; 4 pages; Europe.
European Patent Office; PCT Written Opinion of the International Searching Authority, Issued in Connection to PCT/US2017/022293; dated May 17, 2017; 7 pages; Europe.
European Patent Office; Communication pursuant to Rules 161(1) and 162 EPC, issued in connection to counterpart application No. EP17704922.8; dated Sep. 21, 2018; 3 pages; Europe.

* cited by examiner

*Primary Examiner* — Alexander M Moore
(74) *Attorney, Agent, or Firm* — Greenberg Traurig LLP

(57) ABSTRACT

The present disclosure is related to a family of oil-based dispersions of organic and inorganic metal compounds for use as a hydrogen sulfide scavenger in asphalt, and the preparation thereof. These dispersions comprise organic and inorganic metal compounds, organic solvents, an organoclay suspension agent, an emulsifier and optionally a polymeric stabilizer. The organic and inorganic metal compounds are in the form of micron-sized particles. Copper-based dispersions are particularly effective at reducing the hydrogen sulfide emission of asphalt in the presence of polyphosphoric acid.

16 Claims, No Drawings

METAL-BASED HYDROGEN SULFIDE SCAVENGER AND METHOD OF PREPARING SAME

RELATED APPLICATIONS

This application claims the benefit, and priority benefit, of U.S. Provisional Patent Application Ser. No. 62/308,071, filed Mar. 14, 2016, the disclosure and contents of which are incorporated by reference herein in their entirety.

BACKGROUND OF THE INVENTION

Description of the Related Art

Asphalt is commonly used in the construction and paving of roads. Asphalt is a mixture of aggregate material, such as sand, gravel and crushed stone with hot bitumen. Asphalt invariably contains sulfur. The amount of sulfur will depend on the origin of the crude oil, as well as the processes used to refine the crude oil. Sulfur may exist in the form of hydrogen sulfide. It is a colorless, poisonous, flammable gas with a characteristic foul odor.

Hydrogen sulfide may be released from asphalt, in particular when asphalt is heated to a certain temperature, for example greater than 140° C. Hydrogen sulfide emissions are regulated. Therefore there is a need to reduce the amount of hydrogen sulfide in asphalt.

The chemical binders used in asphalt manufacturing are often modified using a variety of techniques to improve their properties and performance, enabling terminal operators to enhance the value of asphalt products. In North America particularly, binders such as polyphosphoric acid (PPA) have been used for many years. During asphalt refining, hydrogen sulfide levels can be a serious HSE concern, requiring a hydrogen sulfide scavenger program to help mitigate the risk. However, mixing a PPA modifier into the scavenged asphalt product can pose an additional threat as it can trigger the regeneration of hydrogen sulfide. The resulting reaction can significantly increase HSE hazards and operational risks if not properly treated.

This issue has become a growing concern for asphalt terminal operators, as current treatment programs are unable to prevent PPA-based hydrogen regeneration at economical dosage rates.

SUMMARY

Disclosed herein are various illustrative embodiments of a copper based oil soluble hydrogen sulfide scavenger composition. In certain aspects, the composition can include asphalt or asphalt mix and a dispersion of a hydrogen sulfide scavenger in an organic solvent. The dispersion can also include an organoclay suspension agent and an emulsifier. The dispersion of the hydrogen sulfide scavenger can also include a polymeric stabilizer. The hydrogen sulfide scavenger can be a copper based compound. Polyphosphoric acid can be present in the asphalt or asphalt mix. Copper-based dispersions are particularly effective at reducing the hydrogen sulfide emission of asphalt in the presence of polyphosphoric acid.

Also disclosed herein are various illustrative embodiments of a method of preparing a hydrogen sulfide scavenger. In certain aspects, an organo-clay and a surfactant can be added to an oil. The oil can be stabilized with the organo-clay and the surfactant. A copper compound can be added to the stabilized oil. The copper compound can be one or more of copper oxide and copper carbonate. The organo-clay can be organophillic clay.

In certain illustrative embodiments, the copper compound or copper-based compound can be selected from the group consisting of Caesium hexafluorocuprate(IV), Calcium copper titanate, Chlorophyllin, Chromated copper arsenate, Copper aspirinate, Copper benzoate, Copper chromite, Copper gluconate, Copper hydride, Copper ibuprofenate, Copper indium gallium selenide, Copper monosulfide, Copper oxide, Copper peptide GHK-Cu, Copper peroxide, Copper salicylate, Copper selenide, Copper silicide, Copper sulfide, Copper usnate, Copper(I) acetylide, Copper(I) bromide, Copper(I) chloride, Copper(I) cyanide, Copper(I) fluoride, Copper(I) hydroxide, Copper(I) iodide, Copper(I) nitrate, Copper(I) oxide, Copper(I) phosphide, Copper(I) sulfate, Copper(I) sulfide, Copper(I) thiocyanate, Copper(I)-thiophene-2-carboxylate, Copper(II) acetate, Copper(II) arsenate, Copper(II) azide, Copper(II) bromide, Copper(II) carbonate, Basic copper carbonate, Copper(II) chloride, Copper (II) fluoride, Copper(II) hydroxide, Copper(II) nitrate, Copper(II) oxide, Copper(II) perchlorate, Copper(II) phosphate, Copper(II) selenite, Copper(II) sulfate, Copper(II) tetrafluoroborate, Copper(II) triflate, Copper(III) oxide, Cuprate, Copper borate, Copper carboxylate and mixtures thereof.

In certain aspects, the hydrogen sulfide scavenger can include an organic or inorganic metal compound from the group consisting of zinc, iron, chromium, manganese, molybdenum, selenium, strontium, cobalt and vanadium based compounds. The organic or inorganic metal compound can be in the form of micron-sized particles. In certain illustrative embodiments, the particles can have a diameter in the range of 0.5 to 500 microns. In certain illustrative embodiments, the particles can have a diameter in the range of 1 to 50 microns. In certain illustrative embodiments, the particles can have a diameter in the range of 1 to 10 microns. The solvent can be an aliphatic or aromatic solvent. The solvent can further comprise alcohol. In certain illustrative embodiments, the alcohol is not miscible with the aliphatic or aromatic solvent. The solvent can be an alcohol-in-oil emulsion, which provides better suspension properties and lower bulk viscosity for the fluid. The suspension agent can be an oil-soluble clay. The emulsifier can be an oil-soluble surfactant with an HLB value of less than 10. The proportion of hydrogen sulfide scavenger can be between 0.01% and 5% by weight with respect to the total weight of the asphalt composition.

DETAILED DESCRIPTION

Disclosed herein are various illustrative embodiments of a hydrogen sulfide scavenger for use as an additive in asphalt and a method of preparing same.

Baker Hughes Incorporated has developed a SULFIX™ PPA-resistant hydrogen sulfide scavenger program. This program helps mitigate hydrogen sulfide released from asphalt and bitumen products while resisting hydrogen sulfide reversion caused by PPA modification.

In certain illustrative embodiments, the SULFIX™ PPA-resistant scavenger can be injected during the asphalt modification process at the terminal or can be added to asphalt during the production process. The reaction of the SULFIX™ scavenger with hydrogen sulfide is fast and irreversible under standard asphalt manufacturing conditions and resistant to hydrogen sulfide regeneration under PPA-modified conditions. Treating the asphalt with the SULFIX™ PPA-resistant scavenger program helps minimize the safety risks while also protecting downstream transportation and storage equipment from hydrogen-induced corrosion, offering additional economic benefits.

In certain illustrative embodiments, the SULFIX™ PPA-resistant hydrogen sulfide scavengers can be copper-based. For example, one type of SULFIX™ PPA-resistant hydrogen sulfide scavenger is copper carbonate nanoparticles dispersed in organic solvents. Another type of SULFIX™ PPA-resistant hydrogen sulfide scavenger is oil-soluble copper carboxylate. Copper carboxylate can be applied as an acid-resistant hydrogen sulfide scavenger, but the solubility of copper carboxylate is limited in hydrocarbon or aromatic solvents. Therefore, the copper content in the copper carboxylate solution is quite low. The commercial copper-based nanoparticles can be dispersed in hydrocarbon or aromatic solvents at much higher copper contents. However, commercially available copper-nanoparticles-based dispersions are prohibitively expensive.

In certain illustrative embodiments, a method for preparing a copper carbonate dispersion in organic solvents is provided which is useful for scavenging hydrogen sulfide from asphalt without regeneration of hydrogen sulfide when polyphosphoric acid is present. Copper carbonate is in the form of micronized or submicron-sized particles. The stability of copper carbonate suspensions can be enhanced by mixing with organophilic clay and surfactants including polymeric surfactants. Oil-in-oil emulsion technology can also applied for better suspension stability and low viscosity of the fluid.

In certain illustrative embodiments, a method is provided for reducing the concentration of hydrogen sulfide in a hydrocarbon comprising introducing a copper carbonate dispersion into the hydrocarbon especially asphalt.

The presently disclosed subject matter would be desirable in the art to prepare a cost-effective micron-sized including submicron-sized copper-based dispersion for use with hydrocarbons, especially asphalt, while commercially available copper-nanoparticles-based dispersions are prohibitively expensive.

The presently disclosed subject matter would also be desirable to prepare other metal-based dispersions. For example, the organic or inorganic metal compound can be any metal compound used as hydrogen sulfide scavenger including zinc, copper, iron, chromium, manganese, molybdenum, selenium, strontium, cobalt and vanadium based compounds.

In certain aspects, the organic or inorganic metal compound can be in the form of micron-sized particles. In certain illustrative embodiments, the particles can have a diameter in the range of 0.5 to 500 microns. In certain illustrative embodiments, the particles can have a diameter in the range of 1 to 50 microns. In certain illustrative embodiments, the particles can have a diameter in the range of 1 to 10 microns. The solvent can be an aliphatic or aromatic solvent. The solvent can further comprise alcohol. In certain illustrative embodiments, the alcohol is not miscible with the aliphatic or aromatic solvent. The solvent can be an alcohol-in-oil emulsion, which provides better suspension properties and lower bulk viscosity for the fluid. The suspension agent can be an oil-soluble clay. The emulsifier can be an oil-soluble surfactant with an HLB value of less than 10. The proportion of hydrogen sulfide scavenger can be between 0.01% and 5% by weight with respect to the total weight of the asphalt composition.

In certain illustrative embodiments, copper-based compound can be selected from Caesium hexafluorocuprate(IV), Calcium copper titanate, Chlorophyllin, Chromated copper arsenate, Copper aspirinate, Copper benzoate, Copper chromite, Copper gluconate, Copper hydride, Copper ibuprofenate, Copper indium gallium selenide, Copper monosulfide, Copper oxide, Copper peptide GHK-Cu, Copper peroxide, Copper salicylate, Copper selenide, Copper silicide, Copper sulfide, Copper usnate, Copper(I) acetylide, Copper(I) bromide, Copper(I) chloride, Copper(I) cyanide, Copper(I) fluoride, Copper(I) hydroxide, Copper(I) iodide, Copper(I) nitrate, Copper(I) oxide, Copper(I) phosphide, Copper(I) sulfate, Copper(I) sulfide, Copper(I) thiocyanate, Copper(I)-thiophene-2-carboxylate, Copper(II) acetate, Copper(II) arsenate, Copper(II) azide, Copper(II) bromide, Copper(II) carbonate, Basic copper carbonate, Copper(II) chloride, Copper(II) fluoride, Copper(II) hydroxide, Copper (II) nitrate, Copper(II) oxide, Copper(II) perchlorate, Copper(II) phosphate, Copper(II) selenite, Copper(II) sulfate, Copper(II) tetrafluoroborate, Copper(II) triflate, Copper(III) oxide, Cuprate, Copper borate, Copper carboxylate and mixtures thereof.

The present disclosure is related to a family of metal suspensions for use as a hydrogen sulfide scavenger in asphalt, and the preparation thereof. The metal suspensions, and especially copper carbonate suspensions, are particularly efficient at reducing the hydrogen sulfide emissions of asphalt without regeneration of hydrogen sulfide when polyphosphoric acid exists.

Also disclosed herein are various illustrative embodiments of a method for preparing a copper-based oil-soluble hydrogen sulfide scavenger. In certain illustrative embodiments, the hydrogen sulfide scavenger can be prepared by adding a copper compound to oil that has been previously stabilized by organo-clay and one or more surfactants.

The hydrogen sulfide scavenger described herein has a higher copper content and can be prepared at a much lower cost than existing copper-based oil-soluble hydrogen sulfide scavengers.

The copper compound can comprise one or more copper salts such as copper oxide and copper carbonate. For example, the copper oxide can be commercial copper oxide, and the copper carbonate can be copper carbonate particles. The copper compound can be dissolved or dispersed in the oil. The organo-clay can be, for example, organophilic clay.

In certain illustrative embodiments, the hydrogen sulfide scavenger product can comprise a solvent (such as aliphatic, aromatic and polar systems), a copper carbonate basic, an organo-clay (such as Claytone HY), and one or more surfactants (such as Triton X-100). In a specific embodiment, the formulation can comprise Aromatic 150 solvent 52% by weight, Triton X-100 1.0% by weight, Claytone HY 2.0% by weight, and copper carbonate basic 45% by weight.

In certain illustrative embodiments, the copper compound can be dissolved or dispersed into the oil after the organo-clay and surfactants have been added to the oil, such that the oil has been stabilized by the organo-clay and the surfactants. For example, the organo-clay can help to suspend the copper compounds in the oil, and the surfactants can act as a dispersant for the copper compound particles. The resultant fluids are shear thinning, and so they can be pumped easily at high shear rates. In addition, the fluids have sufficient viscosity at low shear rates to prevent the settling of copper salts from the organic solvents.

In certain illustrative embodiments, the hydrogen sulfide scavenger can be prepared by the following sequential steps: (i) first, the organo-clay and surfactants are dispersed or dissolved in the oil; and (ii) second, the copper compounds are added to the oil. The materials can be mixed by mechanical mixing, or by another mixing means as would be understood by one of ordinary skill in the art.

In certain illustrative embodiments, the hydrogen sulfide scavenger can be prepared as follows: Add Aromatic 150 solvent first, and then add Triton X-100 and Claytone HY with stirring. When Claytone HY is mixed well, it usually will take about 10 minutes to 30 minutes. The viscosity of the fluid will increase significantly, and this fluid is a shear-thinning fluid. Next, copper carbonate basic can be added with strong stirring and mixing. When the fluid is homogeneous and has no solids inside, the product can be released from the mixer tank and be packaged. This will usually take 30 minutes to 1 hour.

In certain illustrative embodiments, a multifunctional surfactant and/or a polymeric dispersants can also be added to the hydrogen sulfide scavenger product to provide increased suspension stability.

In certain illustrative embodiments, an oil-immiscible alcohol is added to the suspension to provide increased suspension stability and to lower the viscosity of suspension for easy pumping.

Also disclosed herein are various illustrative embodiments of a copper-based oil-soluble hydrogen sulfide scavenger. In certain illustrative embodiments, the hydrogen sulfide scavenger can comprise a copper compound that has been added to oil previously stabilized by organo-clay and one or more surfactants.

Examples

The following examples are provided to illustrate the invention. The examples are not intended to limit the scope of the invention and they should not be so interpreted. Amounts are in weight parts or weight percentages unless otherwise indicated.

Example 1 and Example 2

In order to obtain better suspension with less settling and top clearing layer, lighter materials should be used. Copper oxide and basic copper carbonate are two types of copper materials which can be used as hydrogen scavengers. Copper oxide has a density of 6.315 g/cm$^3$ and basic copper carbonate has a density of only 4.0 g/cm$^3$. The experimental results also showed that copper oxide particles precipitate faster than basic copper carbonate particles. Therefore basic copper carbonate is used for preparation of copper-based dispersion.

Example 1

2.0 gram organo-clay (Claytone HY) was added into 49 gram aromatic 150 solvent. Mix until fully dispersed. 4.0 gram surfactant Triton X-100 was added with agitation. Finally copper oxide was added slowing with agitation. Continue mixing for 30 minutes after copper oxide charge was complete.

Example 2

2.0 gram organo-clay (Claytone HY) was added into 49 gram aromatic 150 solvent. Mix until fully dispersed. 4.0 gram surfactant Triton X-100 was added with agitation. Finally 45 gram basic copper carbonate was added slowing with agitation. Continue mixing for 30 minutes after copper carbonate charge was complete.

Example 3 and Example 4

Basic copper carbonate was used in Example 3 and Example 4. Two samples of basic copper carbonate from Old Bridge Chemicals Inc. were compared for suspension stability. One is basic copper carbonate (lite) and another is basic copper carbonate (heavy). Copper Carbonate Lite is in 4-5 micron range and Copper Carbonate Heavy is three times bigger than Copper Carbonate Lite. The experimental results also showed that copper carbonate heavy precipitates faster than copper carbonate lite. Therefore copper carbonate lite is used for preparation of copper-based dispersion. We were unable to get a particle size of less than 4 microns by simple grinding. Commercial nanoparticles of copper carbonate were prepared in some other ways but with very high cost.

Example 3

2.0 gram organo-clay (Claytone HY) was added into 49 gram aromatic 150 solvent. Mix until fully dispersed. 4.0 gram surfactant Triton X-100 was added with agitation. Finally 45 gram copper carbonate heavy was added slowing with agitation. Continue mixing for 30 minutes after copper oxide charge was complete.

Example 4

2.0 gram organo-clay (Claytone HY) was added into 49 gram aromatic 150 solvent. Mix until fully dispersed. 4.0 gram surfactant Triton X-100 was added with agitation. Finally 45 gram copper carbonate heavy was added slowing with agitation. Continue mixing for 30 minutes after copper carbonate charge was complete.

Example 5 and Example 6

Basic copper carbonate lite was used in Example 5 and Example 6. In order to further improve the bulk viscosity of the suspension and the suspension stability, 18% propylene glycol was added into the system to replace part of the aromatic 150 solvent. In example 6, a polymeric stabilizer Lifespan3120 was found to be effective to further improve the bulk viscosity of the suspension and the suspension stability. The formulations of Example 5 and Example 6 were listed in Table 1 and their viscosities at different shear rates were also shown in Table 1.

TABLE 1

| | | Formulations and Suspension Viscosity | | | |
| --- | --- | --- | --- | --- | --- |
| rpm | Shear rate, s–1 | 2162-80 Example 5 | 2162-82 Example 6 | 2162-79 Example 7 | 2162-83 Example 8 |
| 1 | 1.7 | 7800 cp | 3352 | 2647 | 2000 |
| 3 | 5.1 | 3196 | 1313 | 1000 | 725 |
| 6 | 10.2 | 1784 | 794 | 558 | 441 |
| 20 | 34 | 694 | 329 | 214 | 182 |
| 60 | 102 | 340 | 168 | 102 | 96 |
| 100 | 170 | 252 | 130 | 77 | 75 |
| 200 | 340 | 170 | 104 | 54 | 56 |
| 300 | 510 | 140 | 97 | 45 | 48 |
| 600 | 1021 | 102 | 79 | 34 | 38 |
| CuCO3 | | 45% | 45% | 30% | 30% |
| LFS3120 | | 0% | 4% | 0% | 2% |
| ATMOS 300K | | 4% | 4% | 4% | 4% |
| Bentone 155 | | 2% | 2% | 2% | 2% |
| Aromatic 150 | | 39.2% | 37.2% | 51.2% | 48% |
| Propylene glycol | | 9.8% | 7.8% | 12.8% | 14% |

Example 7 and Example 8

In order to optimize the product cost with comparable performance, suspensions with 35% copper carbonate were also prepared and their performances were compared. The formulations of Example 7 and Example 8 were listed in Table 1 and their viscosities at different shear rates were also shown in Table 1.

Example 8 was scaled up successfully in Bayport pilot plant as Y16BH12029 (35% copper carbonate). Rheology data (Table 1) and performance as hydrogen scavenger (Table 2) showed that the lab sample and pilot plant sample are comparable.

Rheology study showed that Y16BH12008 (45% copper carbonate) and Y16BH12029 (35% copper carbonate) were all typical shear-thinning fluids which have very viscosity at low shear rates for better suspension and very low viscosity at high shear rates for easy pumping.

Performance testing results showed that Y16BH12008 (45% copper carbonate) and Y16BH12029 (35% copper carbonate) have comparable performance as SX9822. All these copper based hydrogen sulfide scavengers are irreversible which are qualified as PPA-resistant hydrogen sulfide scavengers. The low active Y16BH12029 (35% copper carbonate) was even equal or slightly better than SX9822 (45% copper carbonate). Therefore if we choose Y16BH12029 (35% copper carbonate) as our PPA-resistant hydrogen scavenger, we may have another 20% cost reduction compared to Y16BH12008 (45% copper carbonate).

TABLE 2

Hydrogen Sulfide Performance Testing

| Sample | Metal Content, % | Ratio | 24 hrs H2S, ppm | Before PPA H2S, % | After PPA, H2S ppm |
|---|---|---|---|---|---|
| Blank | — | — | 5500 | | — |
| SX9644 | Zinc based | 10:01 | 2500 | 55% | 4000 |
| SX9644 | Zinc based | 20:01 | 3500 | 36% | 5500 |
| SX9822 | 45% CuCO3 | 10:01 | 0 | 100% | 0 |
| SX9822 | 45% CuCO3 | 20:01 | 1100 | 80% | 1000 |
| 2162-80R | 45% CuCO3 | 10:01 | 0 | 100% | 0 |
| 2162-80R | 45% CuCO3 | 20:01 | 400 | 93% | 400 |
| 2162-79-2 | 35% CuCO3 | 10:01 | 0 | 100% | 0 |
| 2162-79-2 | 35% CuCO3 | 20:01 | 800 | 85% | 800 |
| Y16BH11008 (Pilot Plant) | 35% CuCO3 | 10:01 | 0 | 100% | 0 |
| Y16BH11008 (Pilot Plant) | 35% CuCO3 | 20:01 | 600 | 89% | 400 |

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter. Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the appended claims.

The claims are as follows:

1. A composition comprising: asphalt or asphalt mix; and a dispersion of a hydrogen sulfide scavenger in an organic solvent, wherein the dispersion further comprises an organoclay suspension agent and an emulsifier, and wherein the proportion of the hydrogen sulfide scavenger is between 0.01% and 5% by weight with respect to the total weight of the asphalt composition.

2. The composition of claim 1, wherein the dispersion of the hydrogen sulfide scavenger further comprises a polymeric stabilizer.

3. The composition of claim 1, wherein the hydrogen sulfide scavenger comprises a copper based compound.

4. The composition of claim 3, wherein the copper-based compound is selected from the group consisting of Caesium hexafluorocuprate(IV), Calcium copper titanate, Chlorophyllin, Chromated copper arsenate, Copper aspirinate, Copper benzoate, Copper chromite, Copper gluconate, Copper hydride, Copper ibuprofenate, Copper indium gallium selenide, Copper monosulfide, Copper peptide GHK-Cu, Copper peroxide, Copper salicylate, Copper selenide, Copper silicide, Copper sulfide, Copper usnate, Copper(I) acetylide, Copper(I) bromide, Copper(I) chloride, Copper(I) cyanide, Copper(I) fluoride, Copper(I) hydroxide, Copper(I) iodide, Copper(I) nitrate, Copper(I) oxide, Copper(I) phosphide, Copper(I) sulfate, Copper(I) sulfide, Copper(I) thiocyanate, Copper(I)-thiophene-2-carboxylate, Copper(II) acetate, Copper(II) arsenate, Copper(II) azide, Copper(II) bromide, Copper(II) carbonate, Basic copper carbonate, Copper(II) chloride, Copper(II) fluoride, Copper(II) hydroxide, Copper (II) nitrate, Copper(II) oxide, Copper(II) perchlorate, Copper(II) phosphate, Copper(II) selenite, Copper(II) sulfate, Copper(II) tetrafluoroborate, Copper(II) triflate, Copper(III) oxide, Cuprate, Copper borate, Copper carboxylate and mixtures thereof.

5. The composition of claim 1, wherein the hydrogen sulfide scavenger comprises an organic or inorganic metal compound from the group consisting of zinc, iron, chromium, manganese, molybdenum, selenium, strontium, cobalt and vanadium based compounds.

6. The composition of claim 5, wherein the organic or inorganic metal compound is in the form of micron-sized particles.

7. The composition of claim 6, wherein the particles have a diameter in the range of 0.5 to 500 microns.

8. The composition of claim 6, wherein the particles have a diameter in the range of 1 to 50 microns.

9. The composition of claim 6, wherein the particles have a diameter in the range of 1 to 10 microns.

10. The composition of claim 1, wherein the organic solvent comprises i-s an aliphatic or aromatic solvent.

11. The composition of claim 10, wherein the organic solvent further comprises alcohol.

12. The composition of claim 11, wherein the alcohol is not miscible with the aliphatic or aromatic solvent.

13. The composition of claim 11, wherein the organic solvent is an alcohol-in-oil emulsion which provide better suspension properties and lower bulk viscosity for the fluid.

14. The composition of claim 1, wherein the organoclay suspension agent is oil-soluble clay.

15. The composition of claim 1, wherein the emulsifier is an oil-soluble surfactant with a hydrophilic-lipophilic balance value of less than 10.

16. The composition of claim 1, wherein polyphosphoric acid is present in the asphalt or asphalt mix.

\* \* \* \* \*